No. 763,671. PATENTED JUNE 28, 1904.
N. JEPPSSON.
BALANCE FOR RAILWAY WAGONS.
APPLICATION FILED SEPT. 15, 1902.
NO MODEL. 2 SHEETS—SHEET 1.
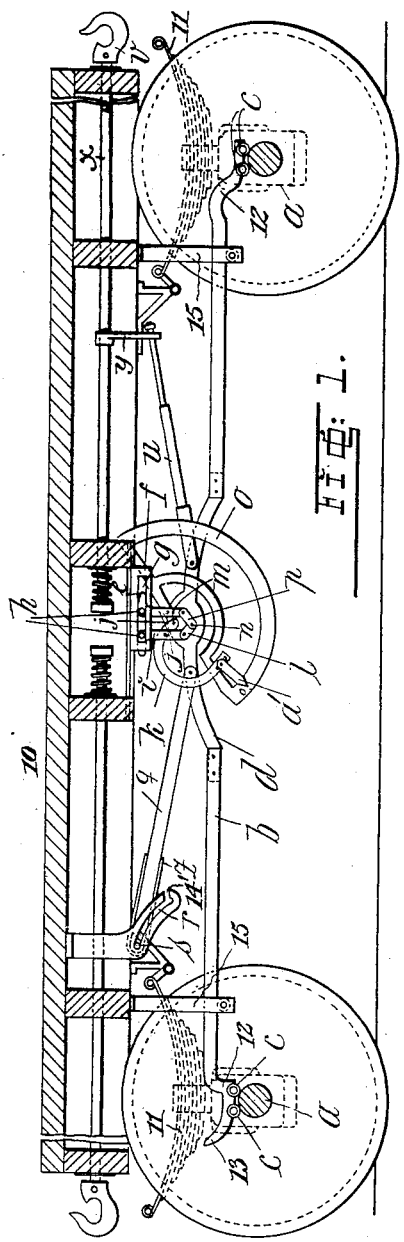
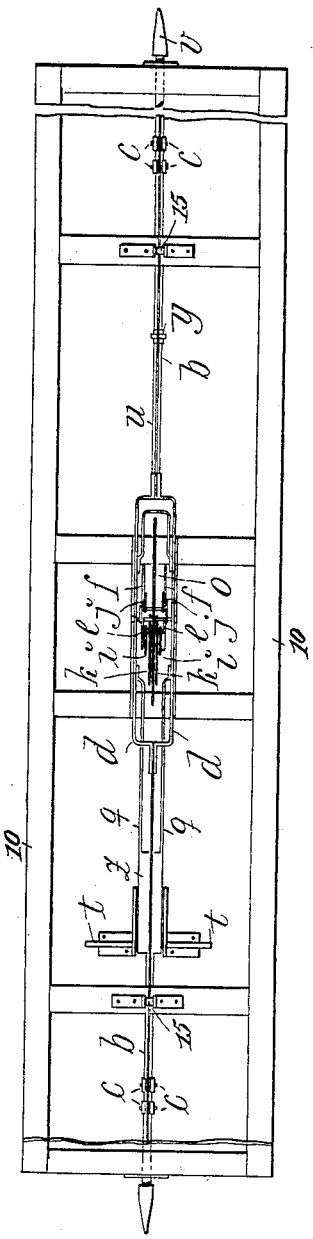

No. 763,671. PATENTED JUNE 28, 1904.
N. JEPPSSON.
BALANCE FOR RAILWAY WAGONS.
APPLICATION FILED SEPT. 15, 1902.
NO MODEL. 2 SHEETS—SHEET 2.
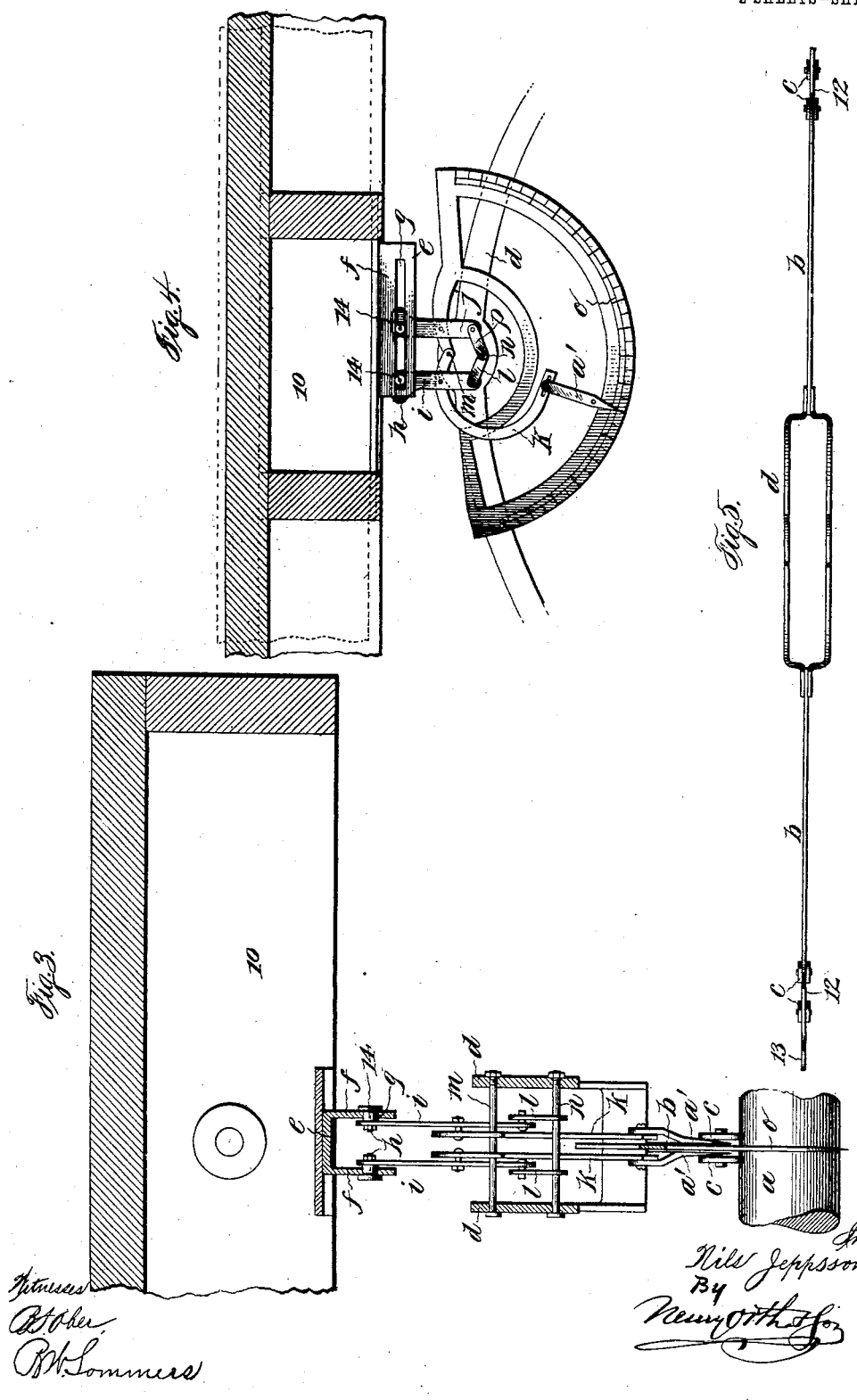

No. 763,671.

Patented June 28, 1904.

UNITED STATES PATENT OFFICE.

NILS JEPPSSON, OF HELSINGBORG, SWEDEN.

BALANCE FOR RAILWAY-WAGONS.

SPECIFICATION forming part of Letters Patent No. 763,671, dated June 28, 1904.

Application filed September 15, 1902. Serial No. 123,468. (No model.)

*To all whom it may concern:*

Be it known that I, NILS JEPPSSON, a subject of the King of Sweden and Norway, residing at Helsingborg, Sweden, have invented certain new and useful Improvements in Balances for Railway-Wagons; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention relates to means for weighing the load on railway-cars and other vehicles without the necessity of carrying the cars to such places where stationary or platform scales are located; and my invention has for its object a weighing mechanism that can be attached to a car and will be ready for use at any time and at any place.

Referring to the drawings, in which like parts are similarly designated, Figure 1 represents a platform railway-car in section with the weighing mechanism shown in elevation and attached thereto. Fig. 2 is a bottom view of so much of a car as is necessary to illustrate my invention with the weighing mechanism attached; Fig. 3, an end view, partly in section, of the weighing mechanism. Fig. 4 is a view similar to Fig. 1, on a larger scale, showing the car loaded; and Fig. 5 is a top plan view of the bar $b$ and frame $d$.

The car-body 10, supported on springs 11, is carried on the axles $a$, forming part of the trucks of the car. Upon the axles $a$ rest the ends of a bar $b$, whose central portion may be preferably formed as a frame $d$, substantially rectangular in plan and shown in the drawings as curved upwardly. The bar $b$ has depending ends 12, that carry friction and supporting rollers $c$, and one of these ends has a guiding-nose 13. In Fig. 1 one side of the frame $d$ of bar $b$ is shown cut away to move clearly upon the balance mechanism.

Beneath the car and over the frame $d$ or central part of the bar $b$ is fixed a plate $e$, the sides $f$ of which are turned down at right angles to the body of the plate and are provided with slots $g$, in which are supported pins $h$, preferably though not necessarily mounted in bowls 14, movable from end to end of the slot. There are two of these pins $h$ in each slot $g$. From one pin in each slot depends an arm $i$, pivoted at or near its end to a link $l$. From the other pin, $h$, in each slot $g$ depends an arm $j$, and at or near its end is pivoted a link $p$, and both the links $l$ and $p$ are pivoted on a rod or pin $n$, passing through the frame $d$ of bar $b$. An arcuate index-arm $k$, carrying in its slotted end an adjustable index-hand $a'$, is pivoted to each arm $i$ and on a bolt or rod $m$, passing through its opposite end. An arcuate scale-beam $o$ is also pivoted on the rod $m$ and to the depending arms $j$ and rotates or swings between the arcuate index-arms $k$, and it is provided with graduations on both sides, so that the weight can be read from both sides of the car. As long as the bar $b$ rests on the axles $c$ of the trucks the balance mechanism indicates the load on the car.

In order to place the balance mechanism out of operation, the bar $b$ or, as shown, the frame $d$ of said bar is pivotally connected to a pair of bars $q$, each weighted at $z$.

Depending from the car are one or two slotted brackets $r$, in the slots or slot of which take a pin or pins $s$, each prolonged sufficiently to form a handle $t$. The slots in the brackets are open somewhat above their lower ends, as shown at 14', to permit the ready assembling of the parts. When the pins $s$ rest in the upper ends of the slots, the bars $b$ or the rollers $c$ rest upon the axles, and in order to disengage the weighing mechanism the handles $t$ and pins $s$ are moved to the lower ends of the slots in the brackets $r$. This will throw the whole mechanism to one side—to the right in Fig. 1—the pins $h$ sliding in the slots $g$. The mechanism will then be suspended on the pins $m$ and $n$, and the index-hand $a'$ returns to zero position. In order not to place too much weight upon the pins $m$ and $n$ when the balance mechanism is out of operation, I preferably provide hangers 15 near each end of bar $b$, through which the latter may slide and which will take most, if not all, of the weight off the pins $m$ and $n$. In order to place the balance mechanism into operative position again, the handles $t$ and the pins $s$ are moved to the upper end of the slots in the brackets *r*, the nose 13 insuring one end of the bar *b* and the curve on the depending opposite end, as well as the rollers *c*, facilitating the bar to ride upon the axles. These rollers *c* support the ends of the bar, and by reason of there being a space between them rest on opposite sides of the axis of the axles *a* and prevent the bar from slipping endwise during the weighing or by reason of any accidental movement of the car.

In order to insure the disengaging of the balance mechanism in case it should be forgotten to be disengaged by hand, I provide an automatic disengaging mechanism comprising a bar *u*, pivoted or otherwise connected at one end to the frame *d* of bar *b*, the other end of this bar *u* slidably connected to an element of the draft-rigging, here shown as a bracket *y*, depending from the draw-bar *x*.

The operation of the device is as follows: The loading of the car compresses the springs, and the body is depressed from dotted-line position, Fig. 4, to the full-line position of said figure. Arms *i* and *j* move down with the body and in unison, the ones, *i*, to which the arms *k* are pivoted, moving these arms around their fixed pivot *m*, and the other, *j*, simultaneously moving the graduated scale-beam *o* around the same center *m*, but in an opposite direction, thereby indicating the load on the car. The hand *a'* can be adjusted in a slot in the end of the arm *k* to facilitate the setting of the mechanism to the zero-point for different makes and weights of cars. The way in which the weighing mechanism is placed out of operation by hand has been described above. Should this be forgotten, the draft on the hooks *v* will draw the rod *x* when the car is moved. The bracket *y* moves with the rod *x* and will pull the mechanism to the right, Fig. 1, and this will pull the pins *s* from the upper ends of the slots in the brackets *r*. Should the pull on the draft mechanism not be sufficient to wholly displace the weighing mechanism, the weights *z* on the bars *q* will cause the pins *s* to move to the limit of the slots in the bracket *r*, and thereby complete the disengagement.

Having thus described my said invention, what I claim as new therein, and desire to secure by Letters Patent, is—

1. The combination with a yieldingly-mounted car-body and the running-gear therefor; of a reciprocally-movable graduated scale and pointer supported from said car-body, a non-yielding device engaging non-yielding portions of the running-gear and connections between said scale and pointer and the non-yielding device adapted to impart reciprocal motion to the scale and pointer, for the purposes set forth.

2. The combination with a yieldingly-mounted car-body and the running-gear therefor; of a reciprocally-movable arcuate graduated scale and pointer supported from said car-body, a non-yielding device engaging non-yielding portions of the running-gear and connections between said scale and pointer and the non-yielding device adapted to impart reciprocal motion to the scale and pointer, for the purposes set forth.

3. The combination with a car-body, the wheel-axles and draft-rigging; of a weighing mechanism coöperating with the axles and body, and means connected to the draft-rigging and weighing mechanism adapted to place the latter out of operative position when draft is exerted on the rigging, substantially as set forth.

4. The combination with a yieldingly-mounted car-body and non-yielding portions of the running-gear; of a rigid element intermediate the non-yielding portions of the oppositely-situated running-gear, an index-arm and a graduated scale-beam connected to the car-body, and means connected to each and to the rigid element to move said arm and beam, substantially as described.

5. The combination with a yieldingly-mounted car-body and wheel-axles thereof; of a bar extending between and resting on the axles, an index-arm and a scale-beam pivoted on the bar, depending arms on the car-body, one pivoted to the index-arm and the other to the scale-beam to oppositely rotate said arm and beam, substantially as described.

6. The combination with a yieldingly-mounted car-body and wheel-axles thereof; of a bar extending between and resting on the axles, an index-arm and a scale-beam, a pivot on said bar common to both the index-arm and beam, an arm depending from the car-body pivoted to the index-arm and a similar arm also depending from the car-body and pivoted to the beam, a link pivoted to each of said arms, and a pivot on the bar common to said links.

7. The combination with a yieldingly-mounted car-body and wheel-axles thereof; of a bar, rollers resting on the wheel-axles, an arcuate index-arm and an arcuate graduated scale-beam pivoted to the bar, a plate secured beneath the car-body, two arms depending from the plate, having sliding motion therein and respectively pivoted to said index-arm and scale-beam, hand-operated means to slide the entire mechanism longitudinally of the car to disengage said bar from the axles, substantially as described.

8. The combination with a yieldingly-mounted car-body, the draft-rigging and wheel-axles; of a weighing mechanism between the car-body and axles, hand-operated means to move the weighing mechanism into and out of operative position, and means connecting a moving part of the draft-rigging and said weighing mechanism to automatically move the weighing mechanism out of operative position, substantially as described.

9. The combination with a yieldingly-mounted car-body and wheel-axles thereof; of a bar having a central substantially rectangular frame and depending ends to rest on the axles, a plate secured to the car-body having two depending slotted sides, two arms mounted on bowls in the slot of each side, a link pivoted at one end to each arm, a pin on which the links are pivoted at their other ends, two arcuate index-arms each pivoted to one of said arms, an arcuate graduated scale-beam pivoted to two of said arms, a pivot common to the index-arms and scale-beam, and passing through said frame, slotted brackets depending from the car, weighted arms connected to the frame, and pins on said arms movable in the slots of said brackets and means to connect a movable element of the draft-rigging to the frame of the aforesaid bar to automatically move the mechanism out of operative position, substantially as described.

10. The combination with a car-body and wheel-axles; of a bar $b$ resting on the axles when in weighing position, a weighing mechanism intermediate said bar $b$ and the car-body, brackets depending from the car-body having arcuate slots, a bar $q$ movably connected to said bar $b$, weights secured to the bar $q$, pins secured to said bar $q$, and taking in the slots of said brackets, whereby when said pins are moved from the topmost position in the slots the weights will cause them to move the full length thereof and return the weighing mechanism to zero position, substantially as described.

In testimony that I claim the foregoing as my invention I have signed my name in presence of two subscribing witnesses.

NILS JEPPSSON.

Witnesses:
N. GUST. ABERG,
A. W. ANDERSON.